United States Patent

Thorell et al.

[11] Patent Number: 5,173,008
[45] Date of Patent: Dec. 22, 1992

[54] FLOATING BARRIER

[75] Inventors: Dan Thorell, Lyckeby; Kjell Tunér, Västerhaninge; Jim Sandkvist, Partille, all of Sweden

[73] Assignee: Kustbevakningen, Karlskrona, Sweden

[21] Appl. No.: 730,881

[22] PCT Filed: Jan. 19, 1990

[86] PCT No.: PCT/SE90/00044

§ 371 Date: Sep. 6, 1991

§ 102(e) Date: Sep. 6, 1991

[87] PCT Pub. No.: WO90/08231

PCT Pub. Date: Jul. 26, 1990

[30] Foreign Application Priority Data

Jan. 20, 1989 [SE] Sweden .................. 8900213

[51] Int. Cl.⁵ ............................................. E02B 15/04
[52] U.S. Cl. ........................................ 405/68; 405/63
[58] Field of Search ............................. 405/66–72, 405/63, 64, 65; 210/923, 242.3

[56] References Cited

U.S. PATENT DOCUMENTS

| | | |
|---|---|---|
| 3,686,869 | 8/1972 | Manuel . |
| 3,686,870 | 8/1972 | Blomberg ............... 405/72 X |
| 3,720,062 | 3/1973 | Mack .............................. 405/71 |
| 3,798,911 | 3/1974 | Oberg . |
| 3,800,542 | 4/1974 | Cerasari ....................... 405/72 |
| 3,811,285 | 5/1974 | Ballu . |
| 3,852,965 | 12/1974 | Rudd ............................ 405/72 |
| 4,068,478 | 1/1978 | Meyers et al. . |
| 4,272,214 | 6/1981 | Nyfeldt et al. ............... 405/72 |
| 4,295,755 | 10/1981 | Meyers ........................ 405/66 |

FOREIGN PATENT DOCUMENTS

| | | |
|---|---|---|
| 321644 | 3/1970 | Sweden . |
| 340593 | 11/1971 | Sweden . |
| 348249 | 8/1972 | Sweden . |
| 424205 | 7/1982 | Sweden . |

*Primary Examiner*—Dennis L. Taylor
*Attorney, Agent, or Firm*—Jacobson, Price, Holman & Stern

[57] ABSTRACT

The invention relates to an elongated floating barrier for use in controlling and concentrating substances floating on a liquid surface, preferably oil floating on a water surface. The barrier comprises a front shield towards the front surface (2) of which the substances are deposited and transported sideways along the shield as the barrier is moved relative the liquid surface. The front shield is inclined in such a way that its upper edge (5) is abaft its lower edge (6) and a towing means (4) is attached to the lower edge of the shield and arranged to give a mainly horizontal pull in the barrier when it is moved relative the water surface. The deep-going of the front shield and its inclination relative the water surface are regulated by a buoyant member (7), which is extended along the back (3) of the front shield and the lower face (8) of which is connected with the lower edge (6) of the front shield and extended in a backward upward direction so that it intersects the water surface when the barrier is in operational position.

10 Claims, 2 Drawing Sheets

FLOATING BARRIER

This invention relates to an elongated, floating barrier for use in controlling substances floating on a liquid surface, preferably oil floating on a water surface. More particularly the invention relates to a barrier of the type comprising a front shield, towards the front surface of which the substances are deposited and transported sideways along the shield as the barrier is moved relative the liquid surface. Such barriers are above all used for directing and aggregating oil on a water surface to a more concentrated string which can afterwards be taken care of by other means. Usually the barrier is towed through the water somewhat inclined relative the towing direction, but it can also e.g. be anchored in a stream.

A disadvantage with previously known barriers of this type is that they admit only a low relative speed between barrier and water surface, in most cases only 1-2 knots, before over- or underflow of the floating substances occurs and stability problems arise. Because the barrier is subjected to a liquid flow towards a relatively large front area, the load on the barrier is very big and uncontrolled oscillatory and rotatory movements easily occur. Different attempts have been made to stabilize the movement of a barrier in tow, but have only resulted in a marginal increase of the possible towing speed and often caused the construction to be bulky and difficult to transport and handle.

An object of the present invention is to provide a floating barrier by which the above mentioned disadvantages of previously known barriers are eliminated. Thus, according to the invention a barrier is provided, which has a new profile of special shape admitting a considerably higher relative speed between barrier and liquid surface that has previously been possible.

A further object of the invention is to provide a barrier, for which the depth and inclination relative the liquid surface are automatically regulated by the current relative speed between barrier and liquid surface, in order to obtain a stable operational position for every speed. The effectiveness of the barrier is hereby increased and the risk for over- or underflow is reduced.

A further object of the invention is to obtain a barrier, which in spite of a relatively complex, hydrodynamically designed profile, can be coiled into a compact transport form and which can be taken into action quickly and easily.

These and other objects and advantages, which will become apparent from the following description, are accomplished by the invention defined in the claims.

The invention will be described in greater detail hereinafter with reference to the accompanying drawings.

Figure 3A:
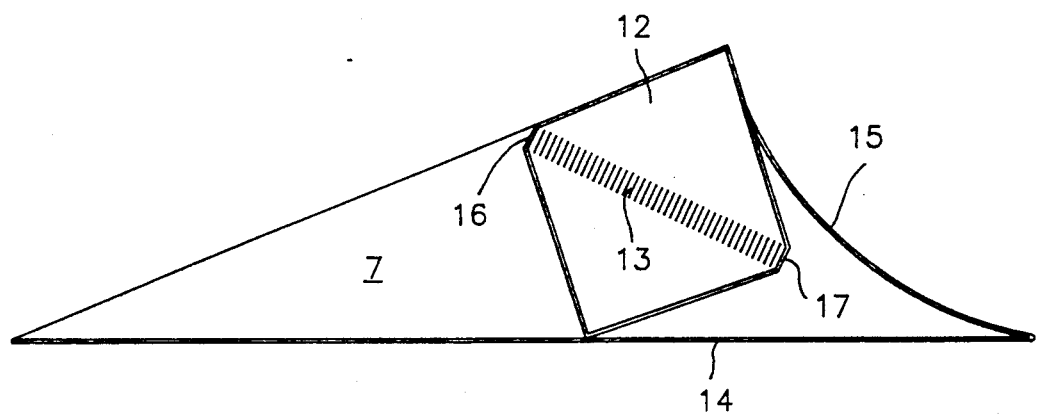
Figure 3B:
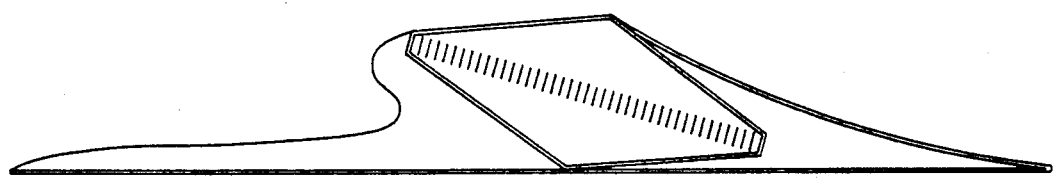
Figure 3C:

FIG. 3 a-c are cross sectional views illustrating embodiments of a barrier with expander means according to the invention.

Figure 1:
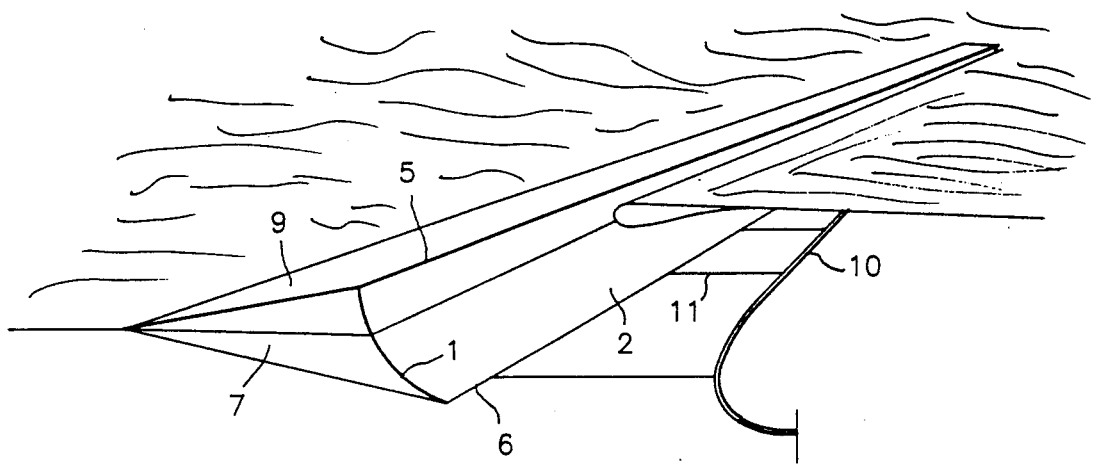
FIG. 1 is a perspective view of an embodiment of a barrier according to the invention, in operational position on a water surface. Subsurface parts of the barrier have partly been exposed.
Figure 2:
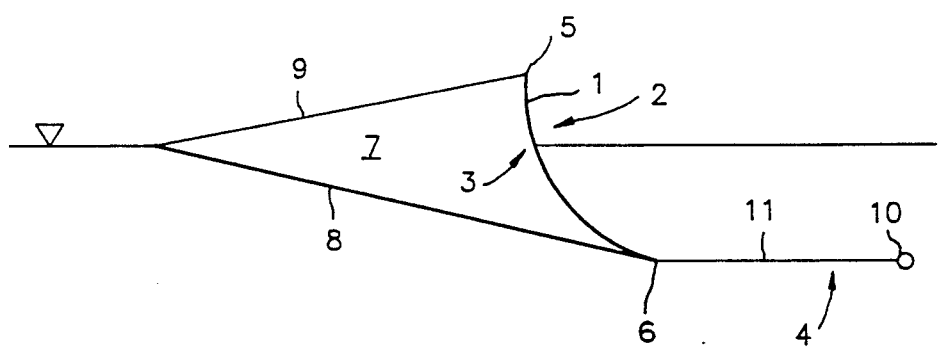
FIG. 2 is a cross sectional view illustrating an embodiment of the profile of the barrier.

FIGS. 1 and 2 illustrate according to the invention an elongated floating barrier, which is illustrated in operational position, i.e. when a relative speed exists between barrier and liquid. The barrier comprises a front shield 1 having a front side 2, a back side 3, an upper edge 5 and a lower edge 6. In operation, the front shield has an upright position with its lower edge 6 under the liquid surface and its upper edge 5 above the liquid surface and is inclined in a backward direction so that its upper edge 5 is abaft its lower edge 6. When the barrier is moved relative the liquid surface facing the direction of movement at an oblique angle, substances floating in the liquid are deposited towards the front side of the front shield and transported sideways along the shield. A towing means 4 is attached to the lower edge 6 and arranged to give a mainly horizontal pull in said edge 6 when the barrier is moved relative the liquid surface. Further, the barrier has a body forming member extending along the backside 3 of the front shield and being arranged to regulate the depth and the inclination of the front shield at said movement of the barrier. The body forming member has an upper face 9 connected with the upper part of the front shield and a lower face 8 connected with the lower edge 6 of the front shield and forms between said faces and said front shield a buoyant body 7. The body forming member is extended in a backward direction from the front shield so the lower face 8 thereof will intersect the liquid surface when the barrier is in operational position.

The barrier can be used in a number of different occasions for controlling solid or liquid substances on a liquid surface, but is primarily intended for use in the guiding and concentration of oil on a water surface. In the following description the invention will for the sake of simplicity be described in connection with this latter use, which should not be interpreted as limitative for the invention.

The towing means 4 is adapted to give a mainly horizontally directed pull attacking in the lower edge 6 of the front shield. The towing means 4 may consist of a cable attached to the lower edge 6 of the front shield throughout the length of the barrier or have the design shown in FIG. 1 or 2, comprising a primary cable 10 situated at a distance ahead of the barrier and connected with the lower edge 6 of the front shield by secondary cables. Each end of the primary cable may in its turn be connected to a tug or other towing device or be anchored when the barrier is located in a flowing water. It is also possible to connect only one end of the primary cable with a tub and to connect the other end with a pulling board, which pulls the barrier out in a certain angle relative the course of the towing boat.

The shape of the barrier makes the center of gravity always is behind the front shield and above the lower edge 6 of the front shield. When the barrier is towed through the water by a pull attacking in the lower edge of the front shield, the front shield will cut in a somewhat downward direction into the water and tend to tip backwards. This is however counteracted by the backwardly extending buoyant body 7, which will lift the steam of the barrier and thereby regulate the inclination of the front shield relative the water surface. Thus the length of the buoyant body in the backward direction is conformed to the size and shape of the front shield. Generally the buoyant element has a length in the water-line overstepping the deep-going of the barrier. As the front shield in this way is prevented from tipping backwards, the barrier is pressed deeper into the water until a position of equilibrium is reached owing to the simultaneously increasing displacement of the buoyant element 7. It is preferred that the front shield has a concave front side in such a way that its lower edge 6 together with the lower face 8 of the body forming member form a relatively acute angle, which will facilitate the water cutting function of the front shield. As a result of the fact that the lower face 8 of the body forming member is connected to the lower edge 6 of the front shield and extended backwards upwards until it interects the water surface, a gradual increase of the displacement is achieved for every increase of the depth. A stable working position will automatically be established for every relative speed between the barrier and the water surface.

Further to this design, it is avoided that whirling and suction effects occur behind the lower edge 6 of the front shield. Such a whirl formation promotes an escape flow beneath the barrier, which is consequently avoided with a barrier according to the invention.

These conditions make it possible to use the barrier at a considerably higher relative speed between the barrier and the water surface than what has been possible with previously known barriers. Tests have e.g. proved that a barrier having the profile shown in FIG. 2, can be towed at a speed of 5-6 knots with a maintained stable operational position in the water.

The embodiments shown in FIGS. 1-3 have a triangular-like cross section, which is the most rational and preferred shape. Because the stern is extended into a pointed edge, favourable hydrodynamic properties and an insignificant whirl formation behind the barrier will be obtained, resulting in a low towing resistance. Also the influence of the wind on the barrier will become small when the profile has this shape. Other cross sectional forms may be used. Particularly the upper face 9 of the body forming member can be varied. E.g. the front shield can be extended above the upper connection between the upper face 9 and the front shield or an extra overflow protection may be arranged as a stand-up part at the upper edge of the front shield.

Besides, there is no absolute requirement that the buoyant body has to be a closed volume as shown in the figures, even if this is preferred with regard to surge etc which might occasionally wash the barrier.

As the barrier primarily is intended for taking care of oil spills at sea and on lakes, it is important that it can be given a favourable format from transport point of view and quickly and easily by taken into use from its transport condition. According to a preferred embodiment of the invention the barrier is thereof made collapsible. The buoyant body of the barrier is thereby filled with gas, preferably air, which can be let out and the barrier deflated to a mainly flat and coilable form.

The buoyant body of the barrier can be inflated by means of a pump or a gas cylinder so as to keep it extended by an internal pressure above atmospheric. An airfilled body can however also be obtained without using pressure above atmospheric, whereby expander means are arranged to expand the barrier from its collapsed condition mechanically by spring action at the same time as air is sucked into the barrier through special valve. Expander means of this type are previously known in the literature and are described in e.g. U.S. Pat. No. 3, 686,869; U.S. Pat. No. 3,798,911; U.S. Pat. No. 4,068,478 and U.S. Pat. No. 4,295,755.

Illustrated in FIGS. 3 a–c are cross sections of an embodiment of a barrier having a specially designed expander means according to the present invention. Different phases of the collapsing of the barrier are illustrated in the FIGS. 3 a–c. The expander means 12 comprises a substantially parallelogram-shaped frame construction, the sidemembers of which are foldable in the corners so that the shape of the frame can be altered, and a spring 13 being arranged between two opposite corners of the frame. The expander means co-operates with ribbonlike stiffening elements 14 and 25 at the expanding resp. compression of the profile of the barrier. A number of co-operating expander means and stiffening elements of this type are located with a certain space between them along the length of the barrier. The stiffening element comprises a bottom-stiffener 15 extending from the front edge to the rear edge of the barrier along the lower face 8 of the body forming member, and a front shield stiffener 15 extending along the front shield from the upper edge to the lower edge thereof. The frame construction of the expander means has one corner attached to the bottom stiffener 14 and the opposite corner attached to the upper part of the front shield stiffener 15 and the spring 13 being arranged between the remaining two corners 16 and 17.

The barrier can be made in a conventional manner from impervious rubber cloth of the like and may e.g. be designed as interconnectable units and be divided into sections by partition walls. The frames of the expander members and the stiffening elements can be made from strips of a relatively stiff plastic material that permits a certain bending.

When taken into operation the barrier is transported to the place of use, preferably in a coiled condition, where it is uncoiled into the water at same time as it is filled with air. When the barrier has expander means as shown in FIG. 3, the barrier is expanded automatically when the compressing force expires by the very act of uncoiling the barrier. In doing so the spring 13 pulls the foldable corners 16 and 17 towards each other and the frame construction lifts the front shield stiffener as shown in FIG. 3 b. Air is simultaneously sucked into the barrier though valves (not shown). The barrier is in this way expanded to the fully extended shape shown in FIG. 3 a. Reference numeral 9 designates the upper face of the body forming member, which in this connection is stretched and works as a stop for the expander means. It is for this purpose however also possible to have a separate, flexible band that is correspondingly stretched and works as a stop for the expander means.

Oil floating on the water surface is thereafter concentrated by towing the barrier by the towing means 4, facing the direction of movement at an oblique angle. Generally the barrier is towed at an angle of 20-30 degrees relative the towing direction. The relative movement between the barrier and the water causes the front shield to cut downwards into the water and the previously described regulation of the depth and the inclination of the front shield relative the water surface occurs. The barrier will thereby take its operational position as shown in FIG. 2. The oil is deposited towards the front shield and transported sideways along the shield and left as a concentrated string in the water. The oil-string is taken care of by a following oil collecting boat or the like. As mentioned earlier the barrier can also be anchored in a flowing water and in a similar way be arranged to guide and concentrate oil and other substrates floating on the water.

The barrier can also be used in other connections where it is desirable to guide and concentrate solid or liquid substances floating on a liquid surface. E.g. the barrier can be mounted in a basin or the like.

We claim:
1. An elongated floating barrier for use in controlling substances on a liquid surface, and for moving relative to the liquid surface at an oblique angle with respect to the direction of movement, comprising:
- a front shield (1) having a front side (2), a back side (3), an upper edge (5) and a lower submerged edge (6) and being inclined so that its upper edge (5) is abaft its lower edge (6);
- a towing means (4) attached to the lower edge of the front shield and arranged to give a mainly horizontal pull on the barrier when it is moved relative to the liquid surface; and
- a body forming member disposed along the back of the front shield having an upper face (9) connected with an upper part of the front shield and a lower face (8) connected with the lower edge (6) of the front shield and forming between said faces and said front shield a buoyant body (7) extended in a backward direction wherein lower face (8) intersects the liquid surface when the barrier is in operational position.

2. Barrier according to claim 1 characterized in that the buoyant body (7) comprises a cross section of a triangular-like shape.

3. Barrier according to claim 1 characterized in that it is collapsible and can be compressed into a mainly flat and coilable form.

4. Barrier according to claim 3 characterized in that it is arranged to be expanded from its collapsed condition by filling the buoyant body (7) of the barrier with gas.

5. Barrier according to claim 3 characterized in that it is selfexpanding by means of spring actuated expanded means (12) disposed in the buoyant body (7).

6. Barrier according to claim 5 characterized in that the expander means (12) comprises a substantially parallelogram-shaped frame construction, the side members of which are foldable at the corners so that the shape of the frame can be altered, and which frame construction has a spring (13) arranged between two opposite corners.

7. Barrier according to claim 5 characterized in that ribbonlike stiffening elements (14, 15) are located with a certain space between them along the length of the barrier and adapted to support the buoyant body (7) of the barrier in co-operation with the expander means (12).

8. Barrier according to claim 7 characterized in that the stiffening element comprises a bottom stiffener (14) extending form the front edge to the rear edge of the barrier along the lower face of the body forming member and a front shield stiffener (15) extending from the upper edge to the lower edge of the front shield and that the frame construction of the expander means has one corner attached to the bottom stiffener and the opposite corner attached to the upper part of the front shield stiffener and a tension spring arranged between the two remaining corners.

9. Barrier according to claim 1 characterized in that the towing means comprises a primary cable (10) running along and at a distance ahead of the front shield (1) and being connected with the lower edge (6) of the front shield by a plurality of secondary (11) cables attached to the primary cable.

10. Barrier according to claim 4, wherein the gas comprises air.

* * * * *